Nov. 25, 1947.   H. W. RALPH   2,431,662
MICROFILM READER AND PROJECTOR FOR RECORDS INDEXED ON MICROFILM
Filed Feb. 20, 1943   6 Sheets-Sheet 2
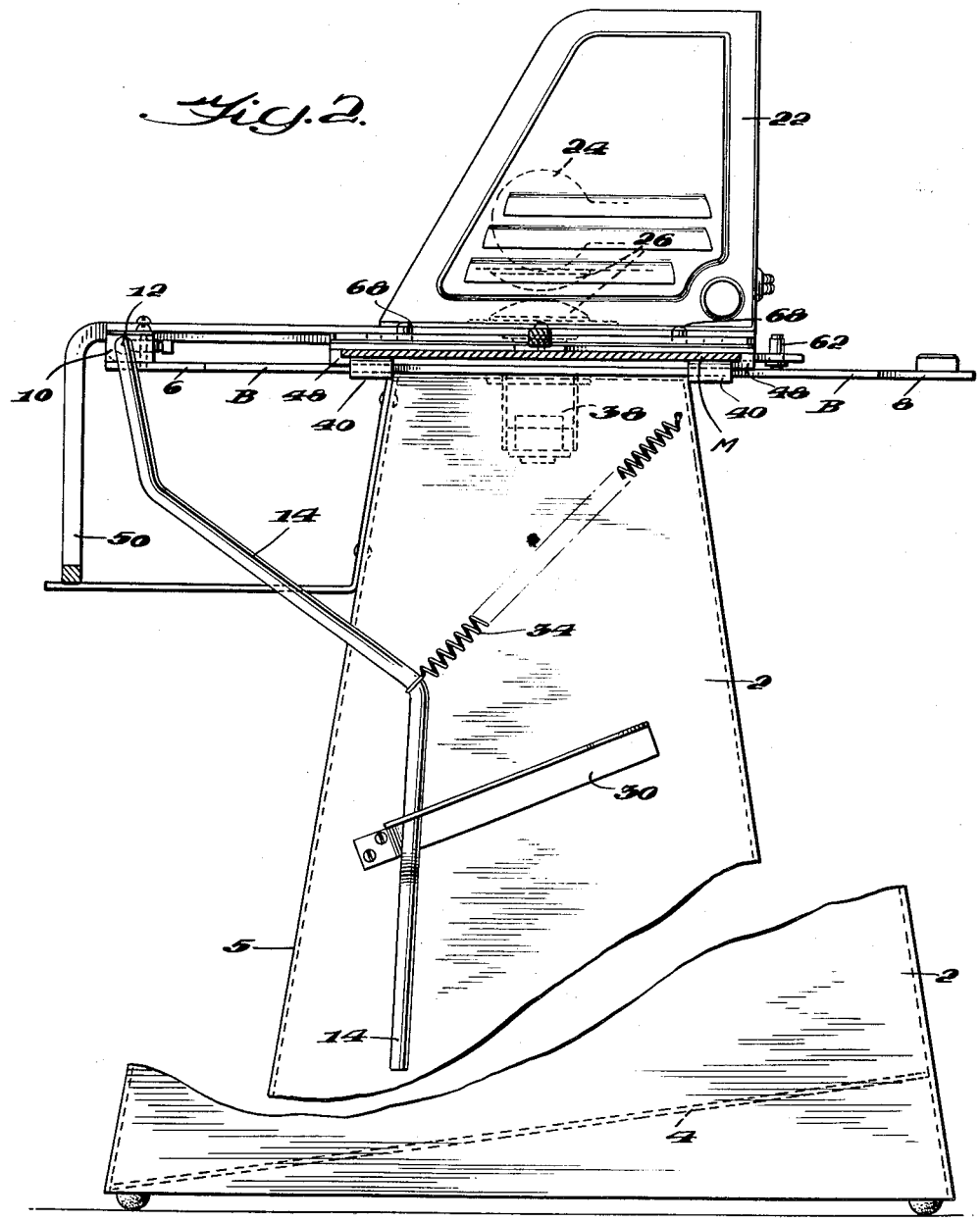
Inventor
HENRY W. RALPH,
By George H. Mitchell
Attorney Nov. 25, 1947. H. W. RALPH 2,431,662
MICROFILM READER AND PROJECTOR FOR RECORDS INDEXED ON MICROFILM
Filed Feb. 20, 1943 6 Sheets-Sheet 3
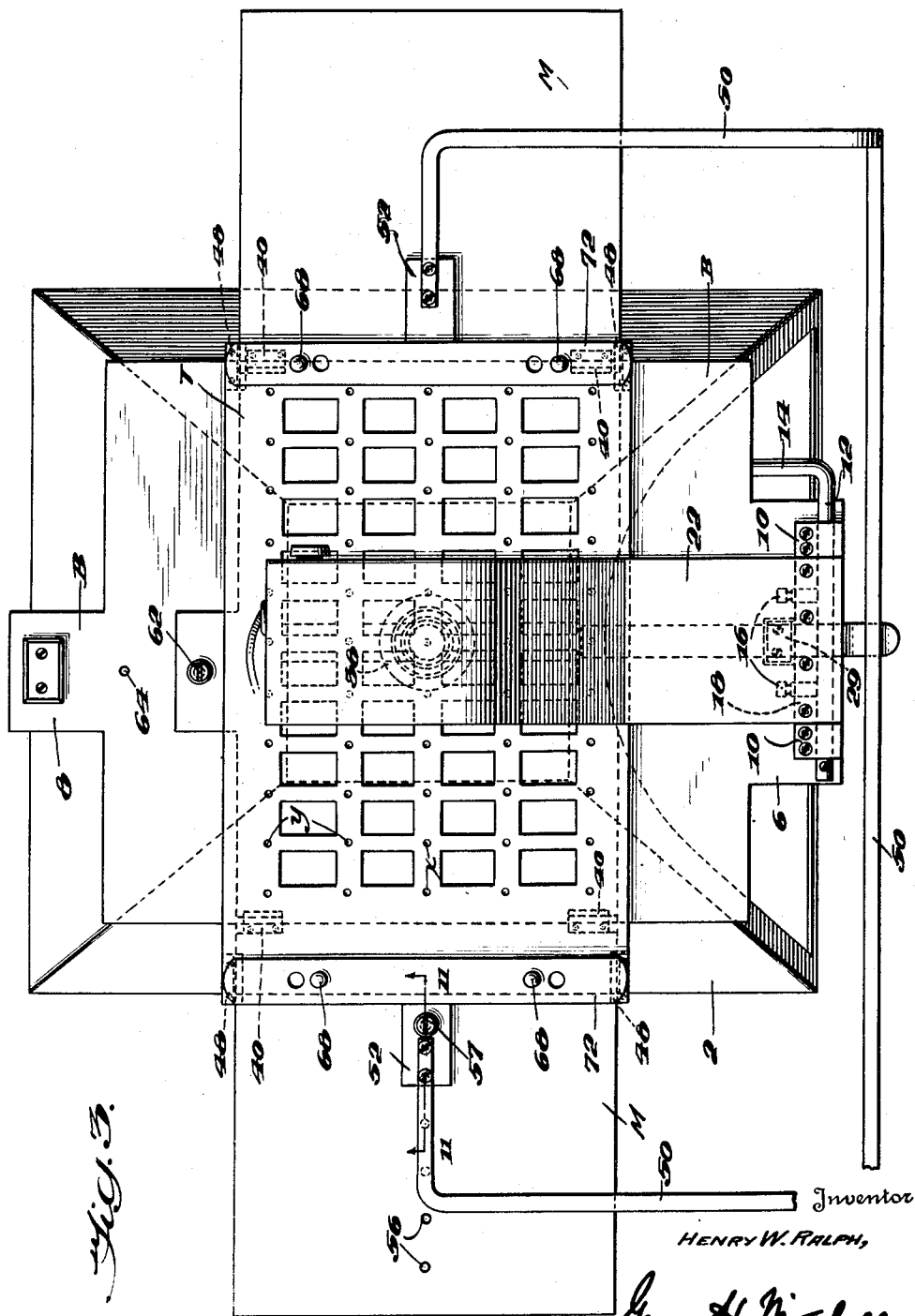

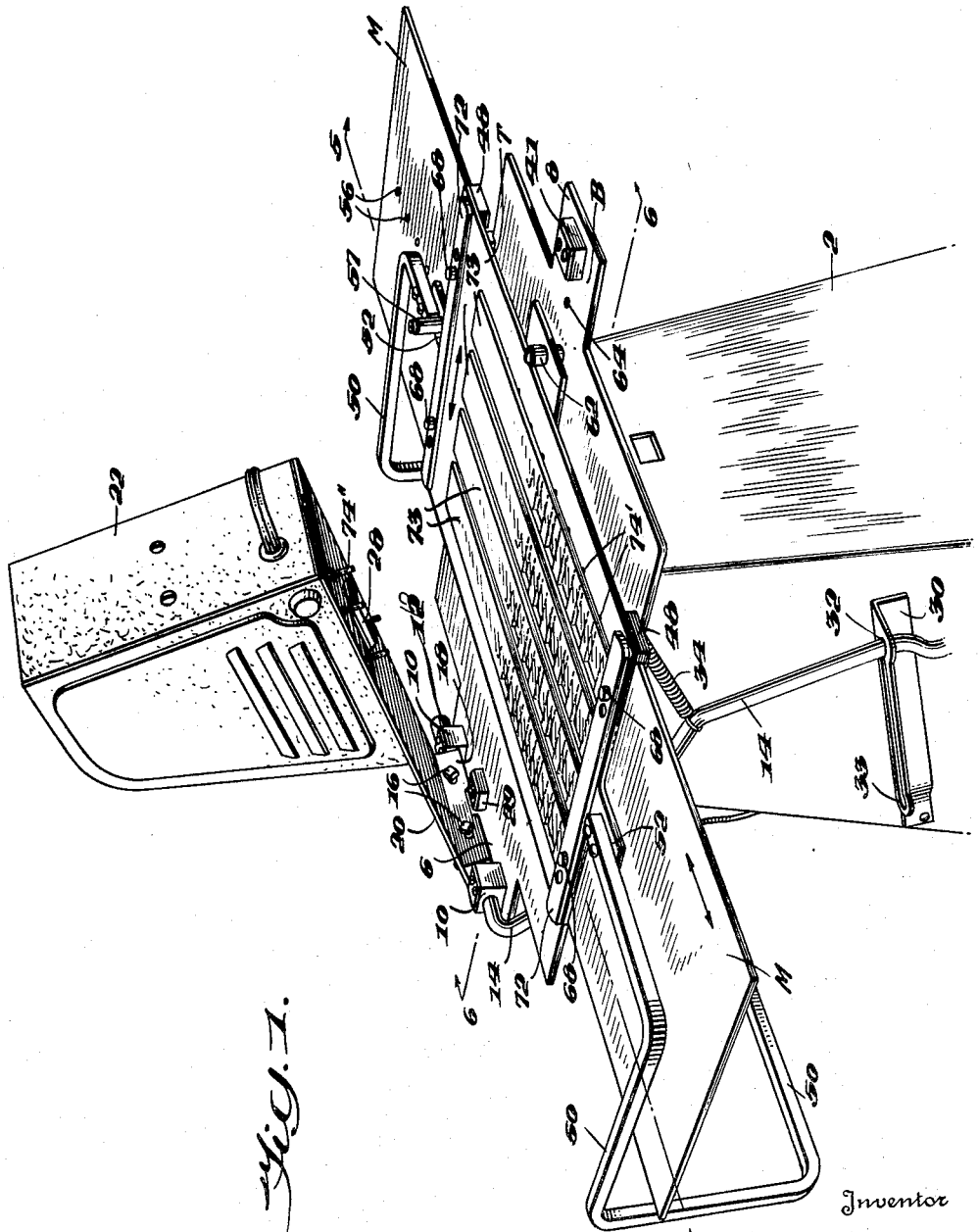

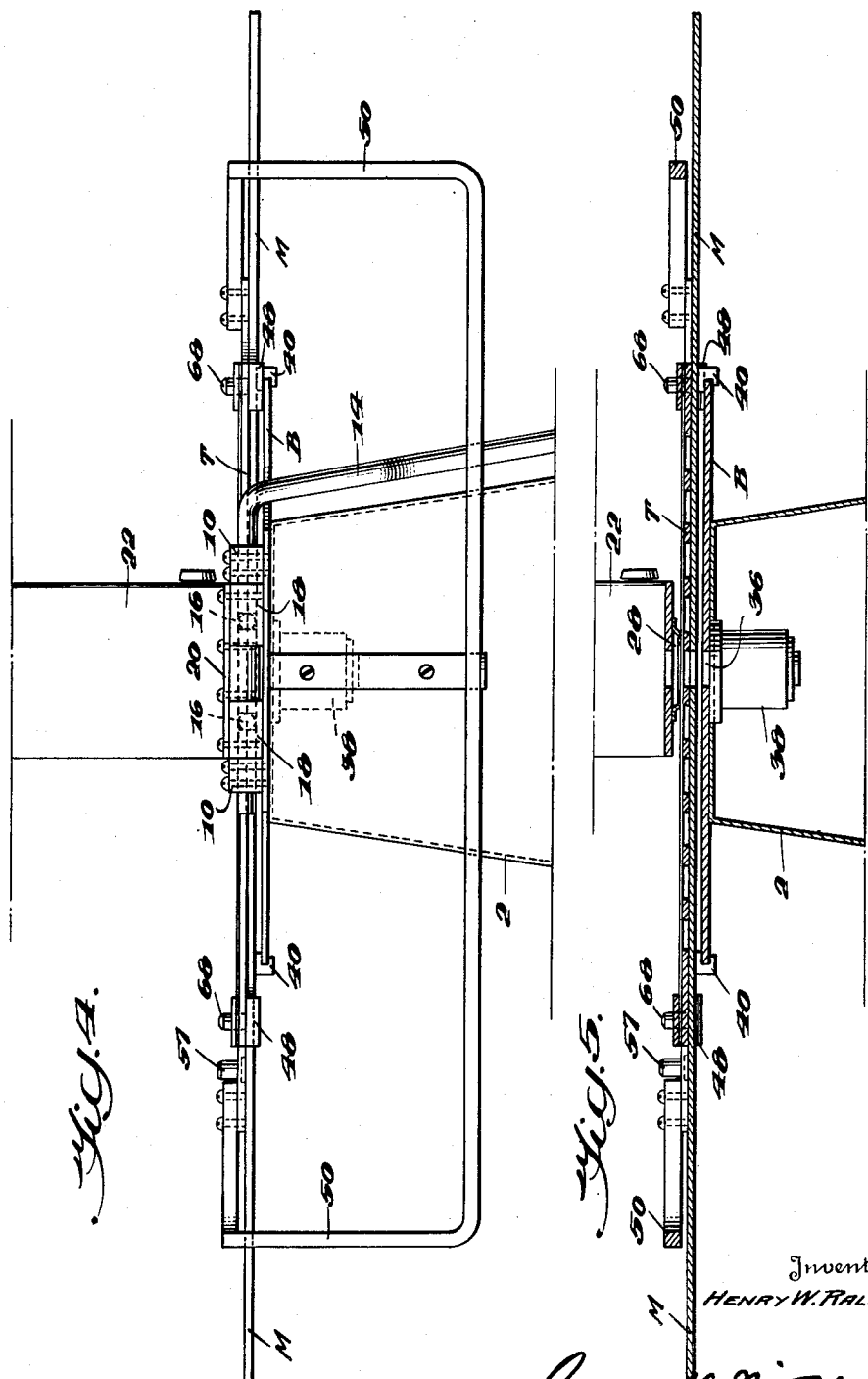

Nov. 25, 1947.                H. W. RALPH                2,431,662
MICROFILM READER AND PROJECTOR FOR RECORDS INDEXED ON MICROFILM
              Filed Feb. 20, 1943         6 Sheets-Sheet 5

Inventor
Henry W. Ralph,
By George H. Mitchell
Attorney

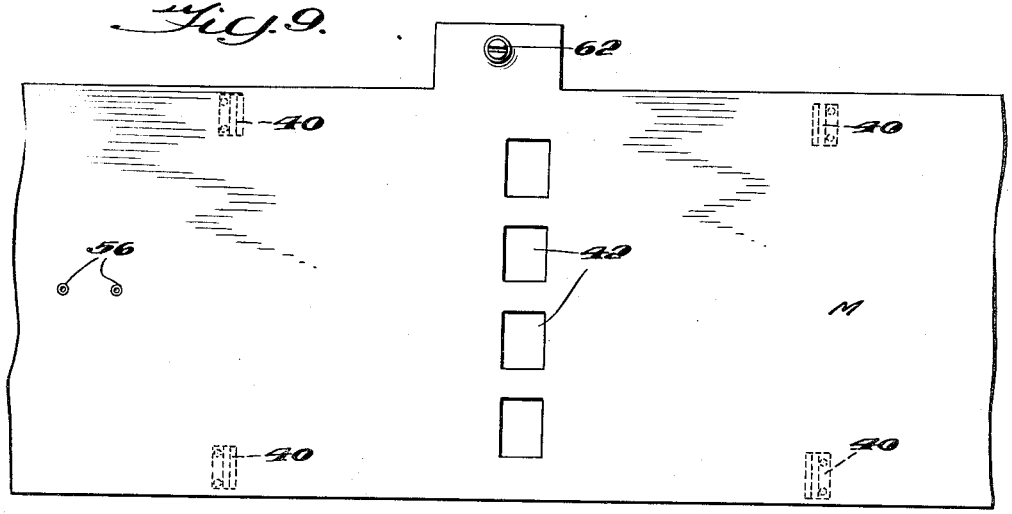
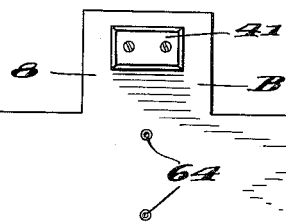
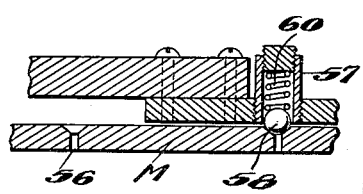
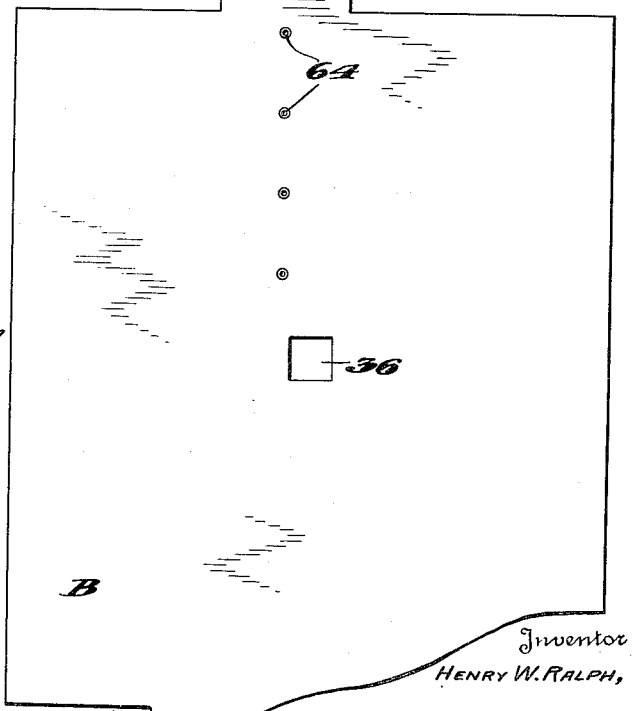

Patented Nov. 25, 1947

2,431,662

UNITED STATES PATENT OFFICE 2,431,662

MICROFILM READER AND PROJECTOR FOR RECORDS INDEXED ON MICROFILM

Henry W. Ralph, Jamaica, N. Y.

Application February 20, 1943, Serial No. 476,658

3 Claims. (Cl. 88—24)

This invention relates to the recording and indexing, on a geographical basis, of deeds, mortgages and other instruments affecting the title to, or involving other interests in real property. The recordation of instruments affecting real property is a universally accepted part of real property transactions. The recordation gives constructive notice of the ownership of, and interests in, parcels of real property. Before a parcel of real property is sold, the purchaser must make a search in order to assure himself that he is buying and paying for a clear title. The purchaser obtains such assurance when he makes a thorough examination of the documents by which title to the property in question was acquired by his grantor. The means for making this examination is provided by making available to the purchaser copies of documents under which his grantor claims title to the property.

Up to the present time, recordation has involved two separate operations: first, the copying of the documents and the binding of the copies in libers; second, the indexing of these libers. Originally when real property consisted of farms and acreage tracts, the documents were copies by hand in bound libers. The documents were then indexed alphabetically according to the names of the parties.

In time, each of these two operations has undergone considerable change. The most important change in indexing was from the alphabetical to the geographical index. This change followed the subdivision of acreage into blocks and lots, which made it convenient to locate a parcel of property by reference to the block number or lot number. Since the interest of a searcher centers in a piece of property, the location of that property constitutes the proper basis for an index to documents affecting that property. The geographical index thus saves the searcher's time. Under an alphabetical index, he must go through all the names bearing the initial letter of the grantor's name. A block index greatly reduces the number of names that the searcher must consult, while an index according to block number and lot number gives him only the entries affecting the parcel in which he is interested.

The copying of documents has changed as the art of reproducing written instruments developed. The evolution was from hand-copying to typewriting, and thence to photostating, which is now used in the register's office in New York city. The photostatic copies are kept in loose-leaf binders which are designated by liber numbers.

The proposed devices and procedures of the present invention involve a number of innovations in operations now used in recording instruments. There will be a change in copying instruments from photostating to micro-filming. Present indexing will be changed by eliminating separate geographical indexing volumes. The new copying instruments will thus radically change the recording of documents in the register's office. It will make innovations in the following operations:

1. Copying of documents;
2. Filing of micro-film records of instruments relating to real property;
3. Mounting of micro-film records;
4. Binding of micro-film records;
5. Projection of micro-film records for reading.

According to the present invention, all of the deeds and other recorded instruments affecting the title of or involving other interests in a particular parcel of property, such as a certain lot in a certain block, are photographed on microfilm and these microfilm images are mounted in regular order on one or more loose-leaf ledger sheets. A particular ledger sheet, therefore, corresponds to and is limited to that particular parcel of property. Such a ledger sheet is self-indexing, in that it may be filed and indexed on a geographical basis. Once such a ledger sheet is made, it is clear that an examination of the instruments recorded thereon in microfilm will enable the searcher to determine very quickly the state of the title to that particular parcel of property. When real property is conveyed or encumbered, the instrument or instruments are microfilmed and attached to the ledger sheet for that particular parcel of property, so that the ledger sheet is kept up to date; where parcels of property are consolidated, a new ledger sheet is made up for the new parcel; where a lot is subdivided, a new ledger sheet is made up for each parcel.

The invention also includes, as a new article of manufacture, a ledger sheet, containing in microfilm, copies of all the deeds and instruments bearing on a particular parcel of property, which sheet can be filed and indexed on a geographical basis, which can be added to as transfers or encumbrances are made. This sheet can then be inserted in a microfilm reader, the images enlarged and projected and the state of the title quickly ascertained.

The invention also includes the microfilm projector or reader, used for projecting enlarged images of microfilm onto a viewing screen, from a ledger sheet, of the type described above. This reader or projector comprises a base, a middle member or plate slidable in a rectilinear path on the base, and a top member or plate slidable in a rectilinear path on the middle member, these two rectilinear paths being at right angles to each other. The top plate carries the ledger sheet containing the microfilm images, and it is evident that by sliding the top plate to the right and left, or forwardly and backwardly, any particular microfilm image may be brought into proper position for projection onto the viewing screen.

The several plates are "light transmitting," which term is used herein to mean that the several plates are of transparent material, preferably a suitable plastic, or are apertured, and so will transmit light when the apertures are in registry.

A light projector is movably mounted above the top plate and projects light through successive selected microfilm images onto the viewing screen. A suitable lens system is provided, focused onto the viewing screen. The ledger sheet carrying the microfilm is accurately positioned on the top plate, at the proper focal distance with respect to the lens system and viewing screen.

Other novel features of the invention will be described in connection with the accompanying drawings, in which:

Fig. 1 is a perspective view of the microfilm projector of the present invention;

Fig. 2 is a side view;

Fig. 3 is a top plan;

Fig. 4 is a front view of the upper part of the projector, looking from the left of Fig. 1;

Fig. 5 is a section on the line 5—5 of Fig. 1;

Fig. 9 is a fragmentary plan view of the middle plate of the apparatus;

Fig. 10 is a fragmentary plan view of the bottom plate of the apparatus; and

Fig. 11 is a sectional view of a detail, taken on line 11—11 of Fig. 3.

Figure 7:
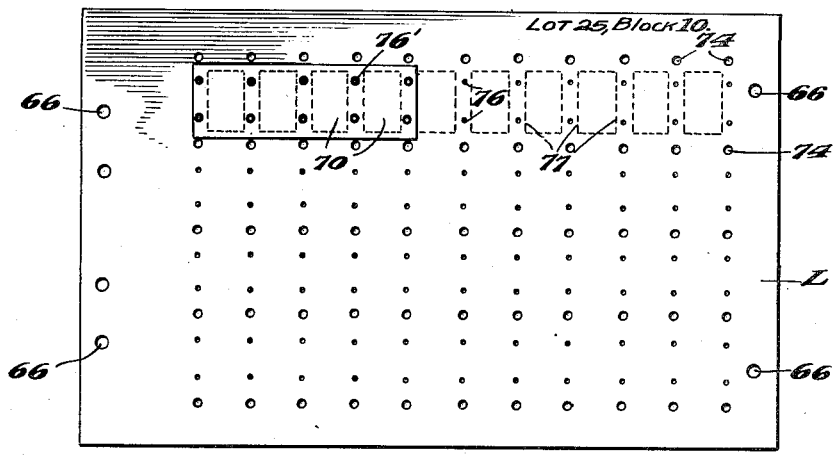
Fig. 7 is a plan view of the ledger sheet for carrying the microfilm images.

Referring now to these drawings, in which similar reference characters indicate similar parts, the micro-film reader of the present invention comprises a vertically disposed four-sided box-like casing 2, in the bottom of which, at the proper angle, is placed a viewing screen 4. The lower front part of the casing is cut away as at 5 so that the screen 4 is visible to the reader. Secured to the top of the casing 2 is a fixed bottom plate B, Fig. 10, provided with a forward shelf 6 and a rear shelf 8. Shelf 6 is provided with bearing blocks 10 in which is journaled a shaft 12, which shaft is extended and bent to provide an actuating handle 14. Secured to shaft 12 by set screws 16 is a block 18, to the top of which is secured a supporting plate 20, which plate in turn supports a light projector box 22 containing a light bulb 24 for projecting light downwardly through a lens system conventionally indicated at 26; the light then passes through an aperture 27 in the bottom of the box, covered by a glass plate 28. A conventional make and break switch 29 is provided, actuated by movement of block 18, so that when the box is in the position shown in Fig. 1, the light is off, while when it is in the operative position of Fig. 2, the light is lighted.

The pivotal movement of the box 22 is controlled by the handle 14, which moves in a slotted guide 30 provided with a latching recess 32, a spring 34 serving to bias handle 14 to such a position that when released the handle snaps into recess 32 and holds the projector box 22 in the raised position of Fig. 1. A similar latching recess 33 serves to hold the box in the lowered or operative position of Fig. 2.

Bottom plate B is made light-transmitting, either by being made of transparent material or by being provided with a light-transmitting window 36, Figs. 5, 6 and 10, below which is mounted a lens tube 38 for projecting an enlarged micro-film image onto the viewing screen 4.

In order to project a particular image onto the viewing screen, there is provided a middle plate M, Fig. 9, which is slidable forwardly and backwardly on the bottom plate B, being provided for this purpose on its underside with channeled guides 40, engaging over the right and left hand edges of the bottom plate, Figs. 4 and 5. This provides the desired freedom of movement in a fore and aft direction, i. e., to the right and left, looking at Fig. 2. Movement of plate M on plate B is limited by a stop 41.

Figure 8:
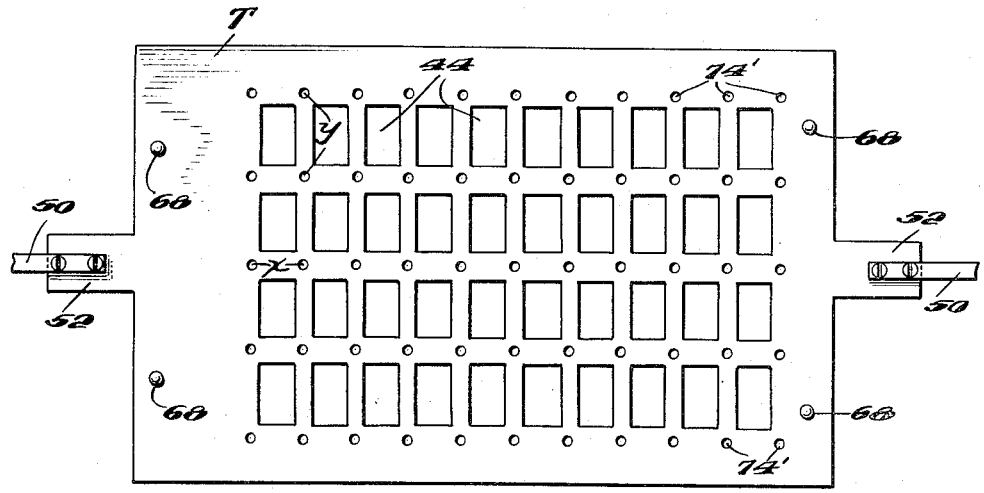
Fig. 8 is a plan view of the plate on which the sheet of Fig. 7 is mounted for projection.
Figure 6:
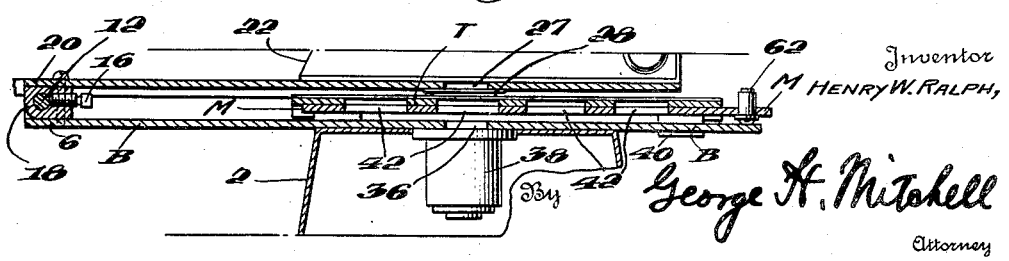
Fig. 6 is a section on the line 6—6 of Fig. 1.

The middle plate M is light transmitting, either by reason of being made of transparent material or by being provided with a plurality of windows or apertures 42, Figs. 6 and 9, which apertures are adapted to register with the apertures 36 in the bottom plate, in whatever position the middle plate may assume. In the embodiment shown, the middle plate has four windows 42. Slidably mounted on the middle plate M is a top plate T, Fig. 8, which slides to the right and left, that is, in a direction at right angles to the fore and aft sliding movement of the middle plate M. The top plate T, as more particularly shown in Fig. 8, is light-transmitting, either by reason of being made of light transmitting material or by being provided with apertures or windows 44, about the size of, or a little larger, than a micro-film image.

The top plate T, which supports the ledger sheet L of micro-film images, is slidably mounted on the middle plate M by the provision of guideways 48 extending from the underside thereof, these guideways being four in number, two for slidably engaging the front edge of the middle plate M and two for slidably engaging the rear edge of said plate. This lateral sliding gives the desired freedom of movement in a lateral direction, toward and away from the observer, looking at Fig. 2.

When top plate T is moved fore and aft, middle plate M slides with it, M sliding on bottom plate B. When top plate T is moved to the right or left, it slides by itself, on middle plate M.

Assuming there are several rows of micro-film images mounted on the top plate T, it is evident that any particular horizontal row of images can be brought in registry with windows 36 and 42 and with the light beam from the light box, by sliding the top and middle plates as a unit back and forth on the bottom plate; then any particular image in a particular row can be brought into proper registry with these windows by sliding the top plate laterally, that is, to the right or left, Fig. 3, on the middle plate. These two movements are thus at right angles to each other.

Each of these sliding movements is effected manually by means of a handle 50 secured to extensions 52 extending from the ends of the top plate, handle 50 being extended forwardly, or to the left toward the operator, so as to clear the bottom and middle plates, as shown in Fig. 1.

Suitable latching or locating devices, which may be resilient, are provided, for enabling the operator to "feel" when the top plate is positioned with an aperture therein in registry with an aperture in the middle plate. To this end, the middle plate M is provided with a series of sockets 56, Fig. 11, laterally spaced a distance equal to the lateral spacing $x$ between the windows 44 in the top plate; a recessed stud 57, carried by the top plate, contains a ball 58 pressed by a spring 60; the ball will snap successively into the sockets 56, which snapping action can be felt by the operator, for indicating that the lateral movement of the top plate is correct for registry of a selected window 44 of the top plate with an aperture 42 in the middle plate.

A similar latching or locating device 62 carried by the middle plate has a ball which snaps into sockets 64 in the bottom plate, sockets 64 being spaced apart a distance $y$ equal to the fore and aft spacing of the windows 44 in Fig. 8. As the operator "feels" the ball snap into the sockets 64, he knows that the fore and aft position of the top plate is correct for registry of a window 42 with the aperture 36 in the bottom plate.

The ledger sheet L, Fig. 7, for carrying the micro-film images, is usually a paper sheet, provided with a plurality of accurately punched holes 66 which are adapted to register with pins 68 on the top plate T, so that when the ledger sheet is positioned on these pins, the micro-film images 70 are in registry with the corresponding windows 44 in the top plate T. In order to hold the ledger sheet L in place on the pins 68, metal strips 72 are used, held in place by gravity, and apertured to take over the pins 68.

In order to provide a flat surface for the underside of the several micro-film images, and to provide an accurate focal plane for the micro-film, strips 73 of transparent material are cemented over the windows 44. Such strips could be dispensed with if the top plate T were itself transparent. In order to lock the top plate T against movement when the projector is in the lowered position, the ledger sheet L is provided with holes 74, which are adapted to register with a corresponding series of holes 74' in the top plate. The underside of light projector 22 is provided with a series of pins 74'', which, when the projector is lowered, pass through holes 74 and 74' and so lock the ledger sheet and top plate as long as the projector is in the lowered position.

Ledger sheet L is also provided with a series of smaller holes 76 through which rivets or eyelets 76' are placed for securing the micro-film image or images 70 in proper registry with the corresponding window in the ledger sheet. As successive micro-film images are placed on the ledger sheet L, successive windows are punched therein, in any suitable way, and eyelets 76' are used to hold the image in proper registry with its respective window. Printed lines 77 may be provided as guides for indicating where the windows should be punched. These lines may be scored lines, so that the windows may be formed by simply manually pushing out the window along such scored lines. However, the windows in the ledger sheet can be pre-punched if desired.

From the foregoing description, it will be evident that if the ledger sheet L, carrying the micro-film images, is placed on the top plate T, over the pins 68, the plate and sheet L carried thereon may be moved in two directions at right angles to each other, for bringing successive micro-film images into successive registry with the light beam and with the windows in the middle and bottom plates. More particularly, the operator pushes or pulls on handle 50, which moves both the top and middle plates which slide as a unit fore and aft on the bottom plate, until the proper row, of the four rows shown in Fig. 8, is in registry with the light beam; this places one of the four apertures 42 in registry with 36 and the light beam; then the operator moves handle 50 to the right or left, thereby sliding top plate T on the middle plate, to bring the desired window 44 in the selected horizontal row, into registry with 42 and 36 and the light beam. In practice, the operator projects the images in any desired sequence. Successive ledger sheets would, of course, be used for a particular piece of property, as needed. If it is desirable to re-examine any image, the right and left, and fore and aft movement of the top plate, enables the operator quickly to position such image for such re-examination.

The ledger sheet L is intended particularly for the mounting of micro-film images, arranged in chronological order, of the various instruments affecting the title of a parcel of real property. That is to say, the ledger sheet L would contain images of all the instruments affecting, for example, lot 25 of block 10 of a particular area. Once such images are assembled on the ledger sheet, the state of the title and of the other interests in such parcel of property may be very quickly ascertained by placing the ledger sheet corresponding to this particular lot, in the reader of the present invention, and the instruments projected onto the viewing screen as desired.

This making of a search is much more rapid than in the case of the procedure which has been used in the past, as hereinbefore described. As successive interests in the parcel in question are recorded, micro-film images of the instruments setting forth such interests would be attached to the ledger sheet, keeping such sheet always up to date. If a particular parcel is consolidated with another parcel of property, a new ledger sheet would be made for the larger parcel. Such ledger sheets would be filed and indexed on a geographical basis, would take up very little storage space, by reason of the use of micro-film and the searching of titles thereby greatly expedited.

While the preferred embodiment of the invention has been illustrated in some detail, it should be understood that the invention is not to be limited to the precise details shown, but may be carried out in other ways.

I claim as my invention:

1. A projector for projecting a succession of microfilm images, comprising a fixed base plate, a middle plate slidable on said base plate, a top plate slidably mounted on said middle plate, to move independently of said middle plate in one direction and to move the middle plate when the top plate is moved in another direction at right angles to the first, all of said plates being light transmitting, means for projecting light through said plates, means on said top plate for accurately positioning thereon a sheet of successive microfilm images, a handle secured to the top plate for moving it in directions at right angles to each other, and snap action latch means cooperating with said top plate for positioning, and for indicating by their snap action, successive positions of the top plate in successive predetermined positions for successive projection of complete microfilm images.

2. A projector for projecting a succession of microfilm images, comprising a fixed base plate, a middle plate slidable on said base plate, a top plate slidably mounted on said middle plate, to move independently of said middle plate in one direction and to move the middle plate when the top plate is moved in another direction at right angles to the first, all of said plates being light transmitting, means on said top plate for accurately positioning thereon a sheet of successive microfilm images, a light projector for projecting light through said plates, mounted to move close to said top plate, and away therefrom, and locking means cooperating with said light projector and with said top plate, for locking the top plate against movement when the projector is close thereto, in projecting position.

3. The combination of a captioned viewing sheet containing microfilm images, said sheet being made to fit the top plate of a microfilm reader, which reader comprises a fixed base plate, a middle plate slidable on said base plate, a top plate slidably mounted on said middle plate, to move independently of said middle plate in one direction, and to move the middle plate when the top plate is moved in another direction at right angles to the first, all of said plates being light transmitting, means for projecting light through said plates, means on the top plate for accurately positioning thereon said viewing sheet of microfilm images, a handle to move said top plate in directions at right angles to each other, and snap action latch means cooperating with said top plate for positioning and for indicating by their snap action successive positions of the top plate in predetermined positions for projection of complete microfilm images, said viewing sheets carrying a plurality of microfilm images segregated according to selected indexing titles, thereby becoming self-indexing and capable of filing in appropriate files according to a previously adopted indexing system, the images being fastened on said viewing sheets in predetermined positions determined by the position locations of the top plate as established by the latching means cooperating with said top plate.

HENRY W. RALPH.

REFERENCES CITED

The following references are of record in the file of this patent:

UNITED STATES PATENTS

| Number | Name | Date |
|---|---|---|
| 1,233,076 | Lowerstein | July 10, 1917 |
| 1,465,353 | Donaldson | Aug. 21, 1923 |
| 1,738,054 | Hill | Dec. 3, 1929 |
| 1,889,575 | Sebille | Nov. 29, 1932 |
| 1,919,433 | Hutchings | July 25, 1933 |
| 1,951,054 | Kennedy | Mar. 13, 1934 |
| 2,008,982 | Hopkins | July 23, 1935 |
| 2,026,500 | Hutchings | Dec. 31, 1935 |
| 2,037,705 | Chapman | Apr. 21, 1936 |
| 2,124,906 | Bryce | July 26, 1938 |
| 2,159,614 | Evans et al. | May 23, 1939 |
| 2,172,330 | Bryce | Sept. 5, 1939 |
| 2,206,206 | Smith | July 2, 1940 |
| 2,223,334 | Robison | Nov. 26, 1940 |
| 2,256,178 | Stuart | Sept. 16, 1941 |
| 2,260,551 | Boni et al. | Oct. 28, 1941 |
| 2,295,000 | Morse | Sept. 8, 1942 |
| 2,304,921 | Hopkins | Dec. 15, 1942 |
| 2,357,674 | McConnell et al. | Sept. 5, 1944 |

OTHER REFERENCES

Science, New Series, July-December 1934, vol. 80, pages 184, 185 cited. (Copy in Scientific Library of U. S. Patent Office.)